July 30, 1968  G. C. CAPRA  3,394,782
SPEED REDUCING TRANSMISSION WITH INTERMITTENT DRIVE
Filed Dec. 20, 1966  3 Sheets-Sheet 1

INVENTOR
G. C. CAPRA
BY MARN & JANGARATHIS
ATTORNEYS

July 30, 1968  G. C. CAPRA  3,394,782
SPEED REDUCING TRANSMISSION WITH INTERMITTENT DRIVE
Filed Dec. 20, 1966  3 Sheets-Sheet 2

July 30, 1968   G. C. CAPRA   3,394,782
SPEED REDUCING TRANSMISSION WITH INTERMITTENT DRIVE
Filed Dec. 20, 1966   3 Sheets-Sheet 3

United States Patent Office 3,394,782
Patented July 30, 1968

3,394,782
SPEED REDUCING TRANSMISSION WITH INTERMITTENT DRIVE
George C. Capra, South Plainfield, N.J., assignor to Pyrofilm Resistor Company, Inc., Cedar Knolls, N.J.
Filed Dec. 20, 1966, Ser. No. 603,339
6 Claims. (Cl. 192—3.5)

ABSTRACT OF THE DISCLOSURE

A motor-transmission assembly for driving a load shaft, which includes a two-stage speed reduction transmission having a slip coupling and at least one stage of speed reduction accomplished by a cam-wheel speed reduction mechanism. The cam-wheel speed reduction mechanism includes a cam element mounted on, or integral with the driving shaft of the motor, and a substantially smooth surfaced wheel which is engaged by the lobe of the cam upon revolution of the drive shaft.

Background of the invention

There are many situations wherein it is required to drive a comparatively lightly loaded shaft at a relatively low speed. Generally, the most available and convenient source of motive or driving power is an electric motor which, unfortunately for low speed considerations, rotates typically at a comparatively high rate of speed. Often these situations are complicated by weight and space requirements which are frequently critical, particularly in the fields of instrumentation, appliance and entertainment.

Heretofore, under these circumstances, designers have generally resorted to motor-transmission assemblies comprising fractional horsepower motors driving highly complicated speed reduction gear trains which, in turn drive load shafts. These motor-transmission assemblies have required speed reductions in excess of one hundred to one to achieve the desired speed reduction and, known gear trains for providing such speed reduction, have typically required four to five stages of speed reduction. Such complex, multi-stage reduction gear trains are expensive and difficult to manufacture, and further, as is well known, such gear trains grow more fragile, and hence less reliable, with the addition of each set of gears.

A further problem has arisen in situations where it is desired, or required, that the device to be driven be operable manually as well as motor driven. Most prior art devices are motor driven through uninterrupted gear trains and, hence, are generally incapable of manual operation due to the high inertia generated by the reduction gearing. Those prior art motor-transmission assemblies which have provided for disengaging the speed reduction gearing so as to permit manual operation of the device, have generally incorporated torque responsive gearing, or other similar mechanisms, which add to the complexity and expense of the end product while detracting from its reliability.

Still further difficulties have been encountered when the device being driven is limited as to the extent of its rotation. The shaft of an ordinary potentiometer, for example, is rotatable back and forth between limits corresponding to maximum and minimum values of resistance. Thus, if a motor has driven a potentiometer shaft to the limit of its rotation, continued supply of power to the locked motor will probably result in damage either to the motor or to the potentiometer, or both. Prior art motor-transmission assemblies have attempted to meet this problem by using switches or torque gearing. These approaches, however, have proven both costly and cumbersome.

Accordingly, it is an object of the present invention to provide a novel motor-transmission assembly which is inexpensive to manufacture and reliable in operation.

Another object of the present invention is to provide a novel motor-transmission assembly wherein the use of conventional reduction gearing is minimized.

Yet another object of the present invention is to provide a novel motor-transmission assembly wherein there is incorporated a simple, inexpensive clutch which will allow rotation or free running of the motor notwithstanding that the driven shaft has reached the limit of its rotation or is otherwise precluded from movement.

An additional object of the present invention is to provide a novel motor-transmission assembly having a clutch incorporated therein which allows manual operation of the driven device and which does not require the disengagement of the transmission gearing.

A still further object of the present invention is to provide a novel speed reduction transmission having a reduced number of speed reduction stages for achieving a given speed reduction and for achieving a compact and relatively light design package.

These and other objects are attained by the present invention wherein there is provided a motor-transmission assembly for driving a load shaft, which assembly includes a two-stage speed reduction transmission wherein at least one stage of reduction is a cam-wheel speed reduction mechanism.

Brief description of the drawings

A more complete understanding of the present invention may be had by a consideration of the following specification and drawings which describe a preferred embodiment of a motor-transmission assembly constructed according to the teaching of the present invention, as well as a few of the possible alternative embodiments which come within the scope of the present invention, and wherein.

Detailed description

Figure 1:
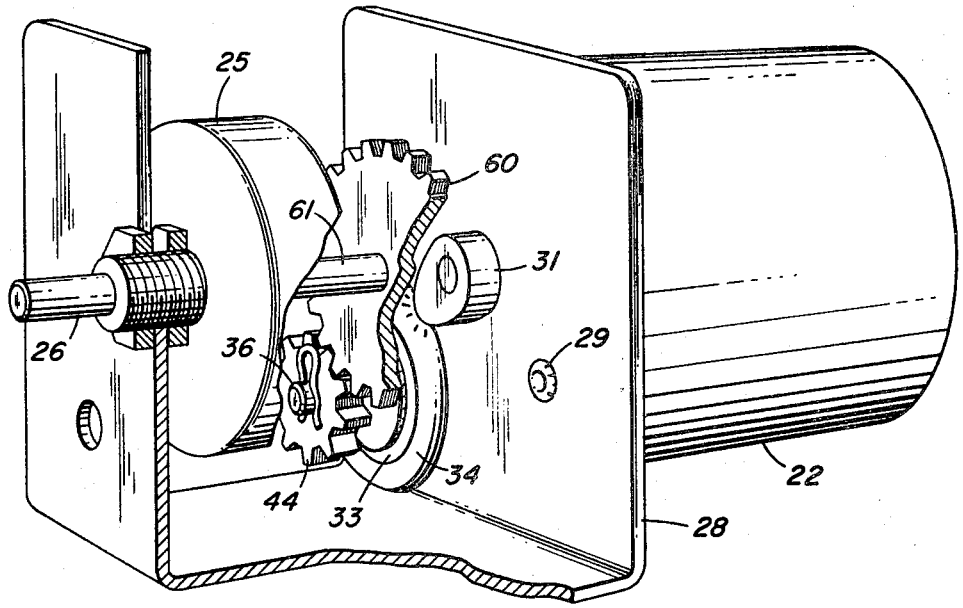
FIG. 1 is a perspective view of a preferred embodiment of a motor-transmission assembly according to the present invention.

Referring now to FIGS. 1 through 5, a motor-transmission assembly 20 including a motor 22 and a speed reduction transmission 24, is shown in combination with a potentiometer 25 which is adapted for either manual or motor driven operation.

The motor 22 is a reversible, synchronous motor which is suitable for driving light loads. Motors of this type are particularly suited for use in driving small control devices, such as the potentiometer 25 shown with the present invention, in that such motors can be made in miniature and relatively inexpensively.

The motor-transmission assembly according to the present invention, when used to drive a potentiometer, may be of particular utility in entertainment apparatus, such as television sets, wherein it may be desirable to provide both manual and remote controlled, motor driven operation of the potentiometer for adjusting various features of the television sets. For example, in a color television set, the potentiometer output may be used to drive a variable gain amplifier in a color contrast circuit. In such an application, the assembly would be mounted in the television set chassis so as to extend the shaft 26 through the cabinet to allow manual rotation, and the motor control leads would be connected to a suitable switch means (located internally of the set and not shown) for operating the motor 22 as to drive the potentiometer 25 in a clockwise or counter-clockwise direction in response to signal from a remote source, e.g., a viewer's hand held signaling device.

The speed reduction transmission 24 of the present invention is a two-stage speed reducing tansmission with an integral friction clutch, the speed reduction ratio being in the order of three hundred to one. One speed reducing stage comprises, generally, a cam-wheel mechanism and the second stage speed reducing stage comprises, generally, a pinion-gear mechanism. The combined use of the two different types of speed reducing mechanisms provides a substantial speed reduction ratio, and yet, such mechanisms require only a minimum of equipment space while providing smooth operation.

Figure 2:
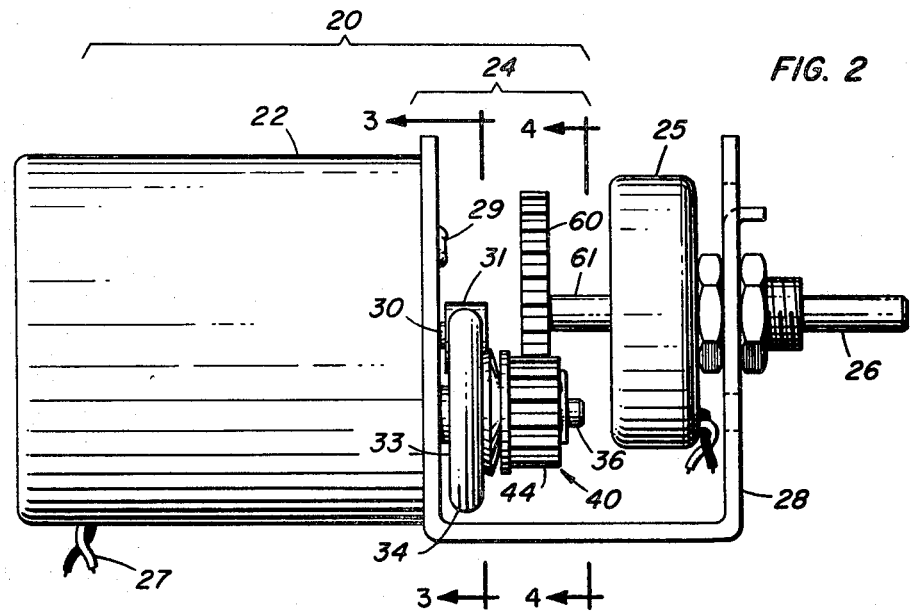
FIG. 2 is a side elevational view of the motor-transmission assembly and potentiometer as shown in FIG. 1.
Figure 3:
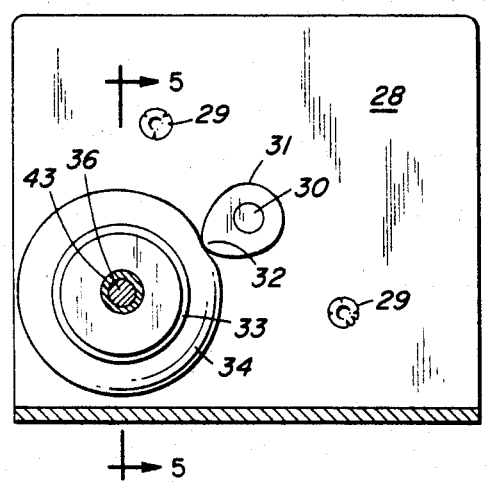
FIG. 3 is a cross-sectional view taken substantially through the plane 3—3 of FIG. 2.
Figure 4:
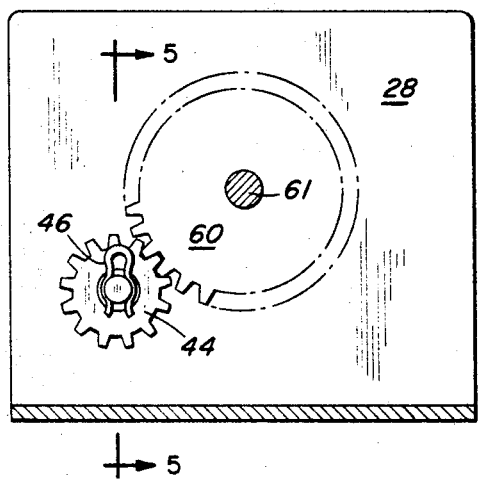
FIG. 4 is a cross-sectional view taken substantially through the plane 4—4 of FIG. 2.

As is best seen in FIGS. 2 through 4, the motor 22 is secured to a generally U-shaped mounting bracket 28 by suitable securing means such as rivets 29. The mounting bracket 28 supports the speed reduction transmission 24, constructed according to the present invention, and also supports the device to be driven, which is, in this embodiment the potentiometer 25. The drive shaft 30 of the motor 22 extends freely through the mounting bracket 28.

The first speed reducing stage, the cam-wheel speed reduction mechanism comprises a cam 31 secured fixedly near or at the end of the motor drive shaft 30. The cam 31 is provided with a single lobe 32.

Figure 5:
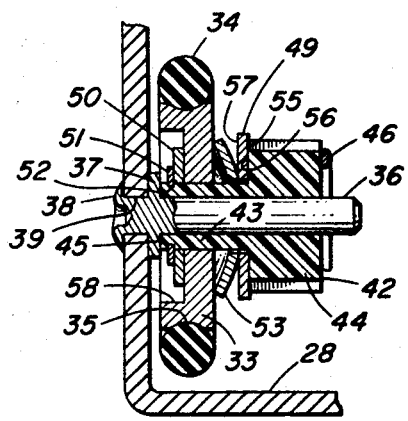
FIG. 5 is a cross-sectional view taken substantially through the plane 5—5 of FIGS. 3 and 4.

A wheel 33 as is best seen in FIGS. 2 and 5, is mounted rotatably on a shaft 36, the shaft being suitably fixedly secured to the bracket 28, and is provided with a resilient ring 34 which resides in a groove 35 formed around the circumferential surface of the wheel. The wheel is mounted in such proximity to the cam 31, that the lobe 32 of the cam 31 engages the ring 34 once for each revolution of the motor drive shaft 30, and imparts rotational movement to the wheel during such engagement. When the cam lobe 32 is not in contact with ring 34, there is no contact between the cam 31 and wheel 33 and hence, no rotational movement imparted to the wheel 33. Accordingly, it will be understood that upon continuous rotation of the motor drive shaft 30 and the 33, cam 31, interrupted rotational motion is imparted to the wheel 33.

Figure 10:
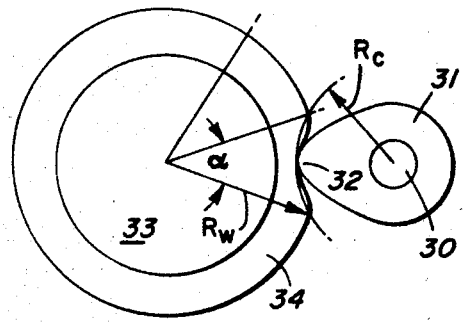
FIG. 10 is a diagrammatic illustration of the operation of the cam-wheel speed reducing mechanism.

As can be seen more specifically from the diagrammatic representation of FIG. 10, the engagement of cam lobe 32 with the wheel 33 during each revolution of the drive shaft 30, will cause a partial revolution of the wheel 33. The amount of rotation imparted to wheel 33 is a function of the amount of time during each rotation of the drive shaft 30 there is engagement between wheel 33 and cam lobe 32, which in turn, is governed by the amount of overlap between the radius of the cam lobe 32 ($R_c$) and the radius of wheel 33 ($R_w$). In FIG. 10, it can be seen that for each revolution of the motor drive shaft 30 and the cam 31 the wheel 33 is rotated through an angle $\alpha$. The turn down ratio in this cam-wheel speed reduction stage is therefore $360°/\alpha°$ to one. In the preferred embodiment of FIGS. 1 through 5, the overlap of $R_w$ and $R_c$ is set so that the angle $\alpha$ is 8°. The turndown ratio is, therefore, $360°/8°$ to one, or forty-five to one. Thus, by varying of $R_c$ and $R_w$, or the amount of overlap therebetween, the turndown ratio can be varied to suit any particular set of design conditions.

The interrupted rotation imparted to the wheel 33 by the drive shaft 30 and the cam 31, is transmitted through a clutch assembly 40 to the second speed reducing stage.

The second speed reducing stage, the pionion-gear speed reduction mechanism, as shown in FIG. 2, comprises a pinion 44 which drives gear 60 and therewith a shaft 61 of the potentiometer 22. The speed reduction of the second stage is, in the manner well-known in the art, determined by the gear ratio of pinion 44 to gear 60, and in the present embodiment is 6.4 to one.

The relationship between the first and second stage speed reduction mechanisms is best described with reference to FIG. 5, which shows a shaft 36, having an annular flange 37, fixedly mounted in bracket 28 with the flange 37 abutting the inner surface of bracket 28. The shaft 36 is secured to bracket 28 by being positioned in an opening 39, formed in the bracket, and by having the edges 38 rolled back to abut the outer surface of bracket 28.

A drive element 42 comprising a journal portion 43 and a pinion 44, is rotatably mounted on the shaft 36 with the edge 45 of journal portion 43 in sliding engagement with shaft flange 37. The drive element 42 is secured against longitudinal movement along the shaft 36 by a retaining spring 46, or other suitable means such as a split ring.

The clutch assembly 40 for frictionally connecting the first and second stage speed reduction mechanisms, comprises a bearing washer 49, a spring washer 53, and a spacing washer 50, all rotatably mounted on the journal portion 43 of the drive element 42. These elements are secured against longitudinal movement along the journal portion 43 by a spring ring 51 mounted in an annular groove 52 in the journal portion 43. The bearing washer 49 is positioned on the journal portion 43 such that the radial surface 55 abuts the opposed radial surface 56 of the pinion 44. The spring washer 53 is a concave washer of spring metal mounted between, and in frictional engagement with the bearing washer 49 and the wheel 33. It is to be recognized that an appropriate spring washer may be selected from among many which are known to those skilled in the art and also that other types of clutch devices such as a spring and detent, or spring loaded ball and detent elements, may be used in place of the spring washer. The spacing washer 50 is mounted between the spring ring 51 and the radial surface of the recessed portion 58 of the wheel 32. The function of the spacing washer 50 is to displace or bias the wheel 33 longitudinally toward the spring washer 53 so as to deflect and thereby load the spring washer. Thus it can be seen that the frictional force exerted by the spring washer 53 against the bearing washer 49 and the wheel 33, can be varied by selectively altering the thickness of the clutch adjustment washer 50. Obviously, if the situation warrants, the clutch adjustment washer 50 may be omitted without altering the operation of the clutch mechanism.

The size of the spring washer 53 and the amount to which it will be initially deflected, if at all, is determined by the load which must be driven. In the present embodiment, the frictional force imparted by the spring washer 53 should be sufficiently great such that, under normal loading conditions rotational movement imparted to the wheel 33 by the motor driven cam 31, is transmitted through the spring washer 53 to the potentiometer driving gear 60 without any slippage. Conversely, the frictional force imparted by the spring washer should be sufficiently small to allow slippage to occur, and hence discount the first and second speed reductions mechanisms, if normal loading conditions are exceeded.

The operation of the embodiment of FIGS. 1 through 5 is as follows. It will be assumed that a signal has been received from the aforementioned remotely situated hand held signaling device which signal requires that the output value of the potentiometer 25 be adjusted. The aforementioned suitable switch means (not shown) will operate the bi-directional motor 22 for appropriate clockwise or counter-clockwise rotation of the motor drive shaft 30. The cam 31, being rotated with drive shaft 30 at approximately 1800 revolutions per minute will rotate the wheel 33 at a rate of 40 revolutions per minute due to the aforementioned thirty to one speed reduction ratio of the first speed reducing stage. The rotation of the wheel 33 will be transmitted through the spring washer 53, and bearing washer 49, to the pinion 44. The pinion 44 drives the gear 60 at a reduction ratio of approximately 6.4 to one, and thus rotation is imparted to the shaft 61 at a rate of substantially seven revolutions per minute.

There will be no effective slippage between the bearing washer 49, the spring washer 53, and the wheel 33 so long as no abnormal load conditions are encountered at shaft 61. If, however, the potentiometer 25 reaches the limit of its rotation in either direction of rotation, and it will be assumed that such has occurred, the shaft 61 and therewith gear 60 and pinion 44, will be precluded from further rotation notwithstanding the fact that rotational movement can be, and it will be assumed, and will be continuing to be proved by the motor. Cessation of rotation of the shaft will have the effect of placing an infinite load on the friction clutch mechanism which, being greater than the normal operating load of the potentiometer by a substantial amount will result in the previously described clutch slippage. Thus, the motor 22 will be allowed to continue to operate without a corresponding rotation being transmitted to the potentiometer 25.

It will now be assumed that the motor 22 is no longer rotating and that it is desired to rotate the potentiometer 25 manually, and that rotational movement is being imparted manually to the potentiometer shaft 26. When the potentiometer is rotated manually, the torques generated by such manual rotation will be transmitted through the second stage reduction mechanism and the clutch assembly 40 to the wheel 33. If wheel 33 is engaged with the cam 31, the cam will be rotated out of engagement with the wheel 33 upon thereof, and thereafter, the motor 22 will be isolated from rotational movement in the speed reduction transmission 24 resulting from manual operation.

It will be appreciated by those skilled in the art, that should the motor 22 become "locked" or "frozen" with the cam lobe 32 in radial alignment with, and in engagement with, the wheel 33 as shown in FIG. 3, the motor-transmission assembly will still be capable of manual operation. Upon the manual application of torque to the potentiometer shaft 26 sufficient to overcome the normal loading of the clutch mechanism, slippage will occur between the wheel 33 and the bearing washer 49. Hence, upon the manual application of additional torque, the potentiometer will turn freely and permit ready adjustment of the potentiometer output.

Figure 11:
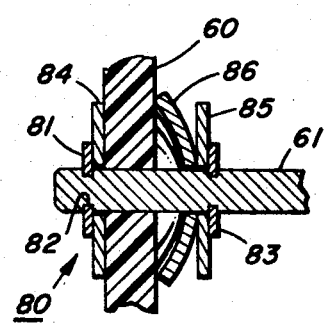
FIG. 11 is a cross-sectional partial view through a plane containing the centerline of the load shaft, and showing the clutch assembly located on the load shaft.

Should the operating requirements of a motor-transmission assembly be such that it is not desirable or permissible to operate the potentiometer manually against the inertia of the speed reduction transmission, the clutch mechanism may be located between gear 60 and shaft 61 as shown in FIG. 11.

Referring to FIG. 11, an alternate clutch mechanism 80 is shown mounted on the potentiometer drive shaft 61, and retained with respect thereto by a spring ring 81 which is received in an annular groove 82 formed in the shaft 61, and a locking ring 83 which may be a split ring, or the like, and which is rigidly secured to the shaft 61. A clutch spacing washer 84 is mounted between the spring ring 81 and the gear 60 to provide the same function as that disclosed above for the clutch spacing washer 50. Bearing washer 85 and the spring washer 86 are mounted between the locking ring 83 and the gear 60. The bearing washer 85, clutch spacing washer 84, gear 60, and spring washer 86 are each rotatably mounted on the shaft 61. Accordingly, it will be understood with respect to this embodiment, that upon the manual application of torque to the potentiometer shaft 26 sufficient to overcome the normal loading of the clutch mechanism 80, slippage will occur in the clutch mechanism and the shaft 61 will turn free of any corresponding rotation of the gear 60.

Figure 6:
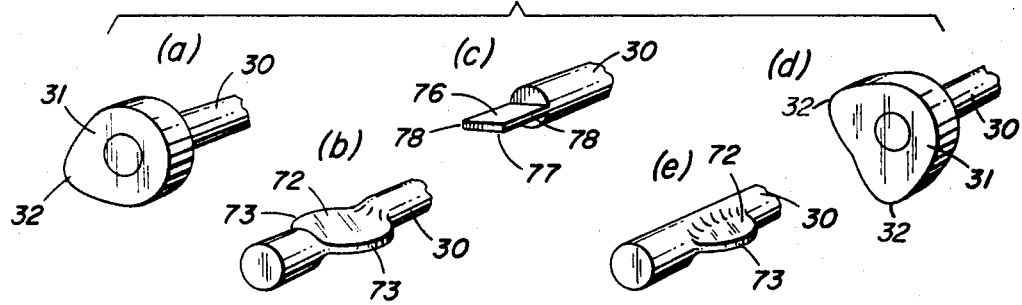
FIGS. 6a through 6c show some of the possible alternative configurations for the cam driving element of the cam and wheel speed reduction mechanism.

It is not necessary that the cam portion of the cam-wheel speed reduction mechanism utilize the conventional cam as shown in the embodiment of FIGS. 1 through 5, and in FIG. 6a.

FIG. 6b shows a motor drive shaft 30 which has a flattened cam section 72 which may be formed by stamping, crimping or other known manufacturing methods. The edges of the flattened cam section 72 extend beyond the circumferential surface of the shaft 30 and define lobes 73 which may be used to intermittently drive the wheel of a cam-wheel speed reduction mechanism. It will be noted, that the embodiment of FIG. 6b will engage a driven wheel twice per motor drive shaft revolution since there are two lobes 73. If only one engagement per revolution is desired, only one side of the shaft need be crimped, such an embodiment being shown in FIG. 6e.

FIG. 6c shows still another cam structure which may be used in the present invention. The end of the motor drive shaft 30 is machined to provide flattened, parallel surfaces 76 and 77. The edges of the machined portion of the shaft define cam lobes 78—78 which are then positioned to engage a wheel for intermittent driving as set forth with respect to the other disclosed embodiments of FIGS. 6a and b. If it is desired to have only one lobe 78, then the shaft is machined so as to remove all but that portion of the material necessary to define a single lobe 78.

FIG. 6d shows yet another cam structure which may be used in the present invention. A drive shaft 30 has a cam element 31 secured thereto, which cam element has two lobes 32 disposed thereon. A cam such as this may be utilized when it is desirable to drive a device intermittently at irregular intervals.

Figure 7:
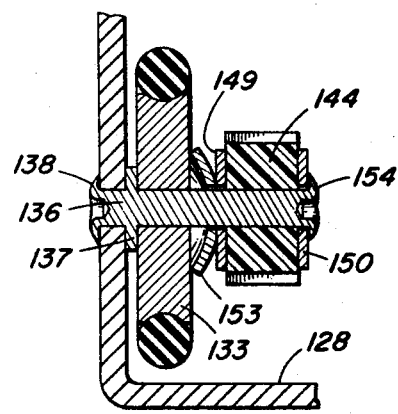
FIG. 7 is a cross-sectional view similar to that of FIG. 5, but of an alternative embodiment of the present invention.
Figure 8:
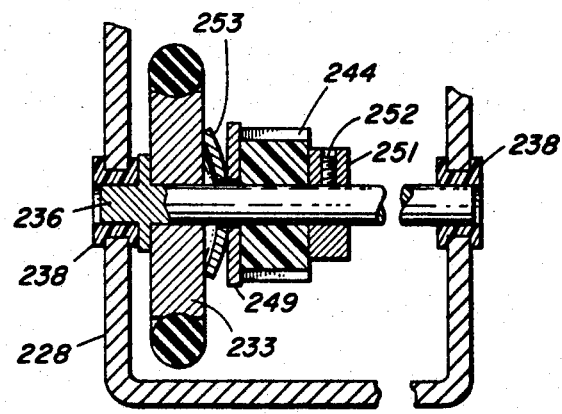
FIG. 8 is a cross-sectional view similar to that of FIG. 5, but of still another alternative embodiment of the present invention.
Figure 9:
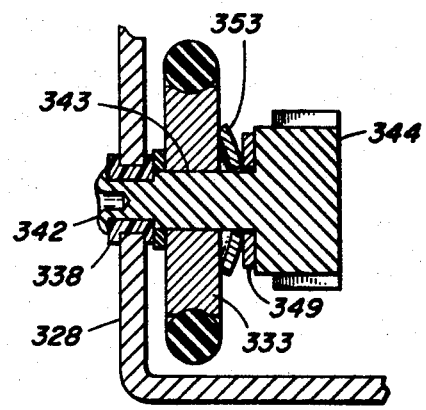
FIG. 9 is a cross-sectional view similar to that of FIG. 5, but of yet another alternative embodiment of the present invention.

FIGS. 7, 8 and 9 show alternate embodiments of the clutch mechanism 130 mounted on a shaft 136 which shaft is rigidly mounted in a U-shaped mounting bracket 128, by the combined action of the shoulder 137 and the rolled edges 138. A wheel 133, the driven wheel of a first or cam-wheel speed reduction stage, is rotatably mounted on the shaft 136 juxtaposed shoulder 137. The clutch mechanism comprises a spring washer 153 and a bearing washer 149, each mounted rotatably on the shaft 136, with the spring washer 153 being mounted on the shaft 136 between the bearing washer 149 and the wheel 133. A pinion 144 is positioned between the bearing washer 149 and a clutch spacing washer 150; the pinion and spacing washer also being rotatably mounted on the shaft 136. The clutch mechanism is secured against longitudinal movement along shaft 136 by the engagement of the rolled edges 154 with the outer surface of the spacing washer 150. It will be seen, therefore, that in this embodiment, rotational movement from the motor drive shaft and cam is transmitted through the wheel 133, spring washer 153 and bearing washer 149 to the pinion 144, which pinion drives the gear 160. It will be understood, that as above, the pinion 144 and gear 160 comprise the second or pinion-gear speed reduction stage. When the resistive torque of a driven device is greater than the frictional force of spring washer 153, slippage occurs, and the first and second stages of reduction are able to function independently.

FIG. 8 shows still another embodiment of a clutch mechanism which may be used in the present invention, wherein a shaft 236 is rotatably mounted in bearing 238 which bearings are positioned in apertures formed in the U-shaped mounting frame 228. Wheel 233, spring washer 253, bearing washer 249 and pinion 244, are all rotatably mounted on the shaft 236. A lock nut 251, provided with a set screw 252, secures the elements of the clutch mechanism against longitudinal movement along shaft 236. The lock nut 251 may also be used to adjust the spring pressure or loading, of the spring washer 253, by selectively securing the elements of the clutch mechanism in positions along the shaft 236 which causes the required deflection of the spring washer. The operation of this embodiment being susbtantially as described above in connection with the other embodiments.

The clutch mechanism embodiment disclosed in FIG. 9, eliminates the requirement for a shaft. In this embodiment there is provided a driving element 342 rotatably mounted in a bearing 338, which bearing is suitably secured in the U-shaped mounting bracket 328. A spring washer 353 is positioned between a wheel 333 and a bearing washer 349, each of which is rotatably mounted in an annular channel 343 provided on the journal portion of the drive element 342. The pinion portion 344, of the drive element 342, drives a gear 360 (not shown) which is connected to a potentiometer shaft 361 (not shown). Thus, it will be seen, that as rotational movement is imparted to the wheel 333 by the motor drive shaft (not shown), the entire motor-transmission assembly of FIG. 9 will rotate within the bear 338. If the travel of potentiometer 322 (not shown) is stopped, slippage will occur between the wheel 333, spring washer 353, bearing washer 349, and the pinion 344.

Figure 12:
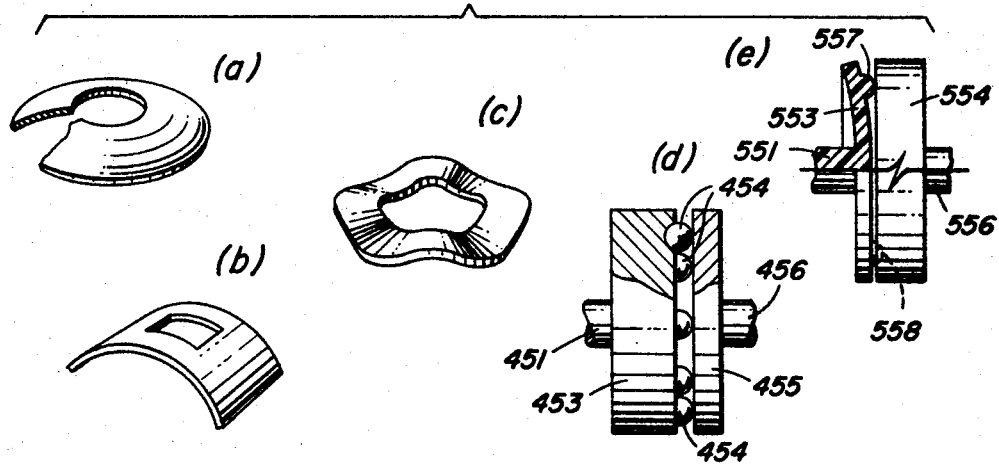
FIGS. 12a through 12e show some of the possible alternative clutch assemblies which may be used in the present invention.

In FIGS. 12a through 12e there is shown a few of the clutch elements which may be utilized according to the teaching of the present invention. Among the spring washer types which may be used are the cup type as shown in FIG. 12a, the U-shaped type as shown in FIG. 12b, and the corrugated type as shown in FIG. 12c. In FIG. 12d there is shown a clutch comprising driving shaft 451 having a plate 453 secured thereon with balls 454 frictionally mounted therein. A second plate 455 is mounted coaxially with plate 453 on driven shaft 456 and in engagement with balls 454. Under ordinary operational loadings, ball 454 remain stationary in plate 453. When the operational load reflected through shaft 456 exceeds a predetermined amount, however, the friction force between balls 454 and plate 453 is overcome and the balls rotate in their pockets thus allowing slippage between driving shaft 451 and driven shaft 456.

FIG. 12e shows still another clutch having a resilient disc 553 integrally mounted on driving shaft 551. A second plate 554 is mounted on driven shaft 556 for rotation therewith. Plate 553 has dimples 557 thereon which cooperate with detents 558 in plate 554. Under ordinary operational loadings, dimples 557 are engaged in detents 558 in the position shown in the lower half of FIG. 12e. When the loading on the driven shaft 556 exceeds a predetermined amount, however, dimples 557 are cammed out of detents 558, as shown in the upper half of FIG. 12e, and the shafts 551 and 556 are premitted relative rotation.

Briefly, and with general regard to the location of the clutch means or mechanism, it will be appreciated by those skilled in the art that whether the clutch means is located between the first speed reduction stage and the second speed reduction stage, or is located between the second speed reduction stage and the output or load shaft, is inconsequential as to the scope of the present invention.

It will be further appreciated by those skilled in the art that although more desirable volumetric and economic efficiencies may be attained by the two stage speed reduction mechanism as disclosed, more than two stages may be utilized without departing from the spirit and scope of the present invention with the limitation, that at least one stage of speed reduction comprise a cam-wheel speed reduction mechanism.

Obviously, many modifications and variations of the present invention are possible in the light of the above teachings. It is therefore to be understood, that within the scope of the appended claims, the invention may be practiced otherwise than as specifically described.

What is claimed is:

1. A motor-transmission assembly for reversibly driving a load shaft comprising:
   a bi-directional synchronous motor having a drive shaft;
   a mounting bracket rigidly secured to said motor;
   said drive shaft extending through a first aperture in said mounting bracket;
   a cam element mounted on said motor drive shaft;
   a shaft rigidly mounted in a second aperture in said mounting bracket;
   a pinion rotatably mounted on said rigidly mounted shaft, said pinion having a geared portion and a journal portion, said journal portion having a diameter smaller than the root diameter of said geared portion;
   a wheel rotatably mounted on the journal portion of said pinion, said wheel being intermittently driven by said cam;
   clutch means disposed between said wheel and said geared portion of said pinion;
   a gear rigidly mounted on an output shaft and in tooth engaging relationship with the geared portion of said pinion;
   means to be driven operatively connected to said output shaft;
   said cam element and said wheel defining a first speed reducing stage and said pinion and gear defining a second speed reducing stage.

2. A two stage speed reduction transmission as claimed in claim 1 and wherein said cam is integral with the drive shaft and has a lobe with a radius greater than the radius of the drive shaft.

3. A two stage speed reduction transmission as claimed in claim 1 and wherein said cam is integral with the drive shaft and has a lobe with a radius equal to the radius of the drive shaft.

4. In a motor-transmission assembly including a reversible motor having a drive shaft rotatable in either the clockwise or counter-clockwise directions, the output rotation of which drive shaft is to be transmitted to a shaft for reversibly driving a load, a speed reduction transmission for transmitting the output rotation of said drive shaft to said load shaft comprising:
   a first stage speed reduction mechanism comprising a cam and a wheel;
   said cam being connected to said drive shaft and engageable with said wheel to impart intermittent rotational movement to said wheel upon the rotation of said drive shaft in either the clockwise or counter-clockwise direction;
   a second stage speed reduction mechanism;
   clutch means for establishing a driving train including said first and second stage speed reduction mechanism and for transmitting the intermittent rotational movement of said wheel to said output shaft;
   said clutch means, upon the load on said output shaft exceeding a predetermined amount, for interrupting said driving train and for interrupting the transmission of said intermittent rotational movement to said output shaft.

5. In a motor-transmission assembly including a reversible motor having a drive shaft rotatable in either the clockwise or counter-clockwise directions, the output rotation of which drive shaft is to be transmitted to a shaft for reversibly driving a load, a speed reduction transmission for transmitting the output rotation of said drive shaft to said load shaft comprising:
   a first stage, reversible speed reduction mechanism comprising a cam and a wheel;
   a second stage speed reduction mechanism operatively connected to said first stage speed reduction mechanism, and comprising a pinion and a gear, said pinion being in engagement with said gear;
   said cam of said first stage speed reduction mechanism being connected to said drive shaft, and upon the rotation of said drive shaft in either the clockwise or counter-clockwise direction, said cam being engageable with said wheel to impart intermittent rotational movement to said wheel, said pinion and said gear;
   clutch means disposed between said second stage speed reduction mechanism and said output shaft;
   said clutch means for operatively interconnecting the gear of said second stage speed reduction mechanism to said output shaft and for transmitting the intermittent rotational movement of said gear to said output shaft; and
   said clutch means, upon the load on said output shaft exceeding a predetermined amount, for disconnecting said gear from said output shaft.

6. In a motor-transmission assembly including a motor having a drive shaft, the output rotation of which drive shaft is to be transmitted to an output shaft for driving a load, speed reduction means comprising:
   a mounting bracket rigidly secured to said motor and having an aperture therein for receiving said drive shaft;
   a cam mounted on said drive shaft;
   a shaft rigidly secured to said mounting bracket;
   a pinion rotatably mounted on said rigidly mounted shaft, said pinion having a gear portion and a journal portion;
   a wheel rotatably mounted on the journal portion of said pinion;
   a gear rigidly mounted on said output shaft and in tooth engaging relationship with the geared portion of said pinion;
   said cam for imparting intermittent rotational movement to said wheel; and
   clutch means disposed between said wheel and said geared portion of said pinion;
   said clutch means for normally transmitting the intermittent rotational movement of said wheel to said pinion and to said output shaft, and for interrupting the transmission of said intermittent rotational movement to said output shaft in response to said load exceeding a predetermined amount.

References Cited
UNITED STATES PATENTS

| | | | |
|---|---|---|---|
| 2,881,630 | 4/1959 | Opocensky | 74—435 |
| 2,930,463 | 3/1960 | Dodge et al. | 192—48 |
| 3,132,527 | 5/1964 | Rocton | 74—84 |
| 3,223,205 | 12/1965 | McCurdy | 74—84 X |
| 3,241,390 | 3/1966 | Kirchner | 74—84 X |
| 3,241,385 | 3/1966 | Tomaro | 74—354 |

FOREIGN PATENTS

| | | |
|---|---|---|
| 445,238 | 9/1925 | Germany. |

BENJAMIN W. WYCHE III, *Primary Examiner.*